US011125170B2

(12) United States Patent
Kokjohn et al.

(10) Patent No.: US 11,125,170 B2
(45) Date of Patent: Sep. 21, 2021

(54) SUPERCRITICAL REFORMING OF FUELS, WITHOUT SEPARATE WATER SUPPLY, FOR INTERNAL COMBUSTION ENGINES

(71) Applicant: Wisconsin Alumni Research Foundation, Madison, WI (US)

(72) Inventors: Sage L. Kokjohn, Oregon, WI (US); David D. Wickman, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 338 days.

(21) Appl. No.: 16/214,248

(22) Filed: Dec. 10, 2018

(65) Prior Publication Data

US 2020/0182165 A1  Jun. 11, 2020

(51) Int. Cl.
*F02D 19/06* (2006.01)
*F02D 19/08* (2006.01)
(Continued)

(52) U.S. Cl.
CPC ..... *F02D 19/0671* (2013.01); *F02D 19/0644* (2013.01); *F01N 3/2066* (2013.01);
(Continued)

(58) Field of Classification Search
CPC ............. F02D 19/0671; F02D 19/0644; F02D 19/0692; F02D 19/081; F02D 19/084;
(Continued)

(56) References Cited

U.S. PATENT DOCUMENTS 6,170,441 B1 * 1/2001 Haldeman .......... F02M 25/0228
123/25 D
7,931,711 B2 * 4/2011 Wootton .................. C01B 3/34
48/127.5
(Continued)

FOREIGN PATENT DOCUMENTS

WO   WO-2008106722 A1 * 9/2008 ............. F02M 25/10

OTHER PUBLICATIONS

Abstract to Martins, M., Lanzanova, T., and Sari, R., "Low Cost Wet Ethanol for Spark-Ignited Engines: Further Investigations," SAE Int. J. Fuels Lubr. 8(2):367-373, 2015, https://doi.org/10.4271/2015-01-0954 (Year: 2015).*
(Continued)

*Primary Examiner* — Grant Moubry
(74) *Attorney, Agent, or Firm* — Craig A. Fieschko, Esq.; DeWitt LLP

(57) ABSTRACT

An engine/reformer system accepts a first fuel and reforms it into syngas for use as a fuel in an accompanying internal combustion engine. Prior to reforming, the first fuel is pressurized and/or heated to at or near supercritical fluid conditions, such that the resulting syngas leaves the reformer in a supercritical fluid state. Injection of the supercritical syngas into an engine cylinder avoids the autoignition problems that occur when gaseous syngas is used. The first fuel is a fully self-reforming fuel (one that needs no separate water supply for complete conversion to syngas), and can beneficially be a "wet" fuel, such as ethanol containing water, allowing the system to use intermediate (Continued)

products of an ethanol production process (such as hydrous ethanol and stillage wastewater) as fuel, and reducing the overall cost of fuel production and engine operation.

21 Claims, 1 Drawing Sheet

(51) Int. Cl.
*F01N 3/20* (2006.01)
*F02M 25/028* (2006.01)
*F02M 25/022* (2006.01)
*F02M 37/00* (2006.01)

(52) U.S. Cl.
CPC ........ *F02D 19/0692* (2013.01); *F02D 19/081* (2013.01); *F02D 19/084* (2013.01); *F02M 25/028* (2013.01); *F02M 25/0228* (2013.01); *F02M 37/0064* (2013.01)

(58) Field of Classification Search
CPC .............. F02D 41/0025; F02M 25/028; F02M 25/0228; F02M 37/0064; F01N 3/2066; Y02T 10/30
See application file for complete search history.

(56) References Cited

U.S. PATENT DOCUMENTS

| | | | | |
|---|---|---|---|---|
| 8,616,177 | B2* | 12/2013 | Reitz | F02D 19/0689 123/304 |
| 10,794,340 | B2* | 10/2020 | Kokjohn | F01N 3/02 |
| 2015/0198085 | A1* | 7/2015 | McCann | F02B 47/06 123/3 |
| 2016/0265416 | A1* | 9/2016 | Ge | F02D 19/0644 |

OTHER PUBLICATIONS

Azimov et al., Combustion Characteristics of Syngas and Natural Gas in Micro-pilot Ignited Dual-fuel Engine, *World Academy of Science, Engineering and Technology International Journal of Mechanical and Mechatronics Engineering*, 2012, vol. 6, No. 12:2863-2870.

Barendregt et al., Development of a supercritical Diesel Reformer in a Hybrid Fuel Cell System, Defense Material Organization, Sep. 2003-Oct. 2010.

Boukis, et al., Methanol Reforming in Supercritical Water, *Ind. Eng. Chem. Res.*, 2003, 42:728-735.

Chuahy, F.D.F. and Kokjohn, S.L., "High Efficiency Dual-Fuel Combustion through Thermochemical Recovery and Diesel Reforming", *Applied Energy*, 2017 https://doi.org/10,1016/j.apenergy.2017.03.078.

Hagos et al., Trends of Syngas as a Fuel in Internal Combustion Engines, *Advances in Mechanical Engineering*, 2014, vol. 2014, Article ID 401587, pp. 1-10.

Mahgoub et al., Performance Study of Imitated Syngas in a Dual Fuel Compression Ignition Diesel Engine, *International Journal of Automotive and Mechanical Engineered (IJAME)*, 2015, vol. 11, pp. 2282-2293 (ISSN: 2229-8649 (Print); ISSN: 2180-1606 (Online) DOI: http://dx.doi.org/10.15282/ijame.11.2015.11.0192.

Picou, Jason W., Autothermal non-catalytic reformation of jet fuel in a supercritical water medium, (2008), *Masters Thesis*, Paper 4675.

Sahoo et al., ABSTRACT—Effect of $H_2O:CO$ ratio in syngas on the performance of a dual fuel diesel operation, *Applied Thermal Engineering*, 2012, vol. 49, pp. 139-146.

Wagemakers et al., Review on the Effects of Dual-Fuel Operation, Using Diesel and Gaseous Fuels, on Emissions and Performance, *SAE International Journal of Engines*, 2012, DOI: 10.4271/2012-01-0869.

* cited by examiner

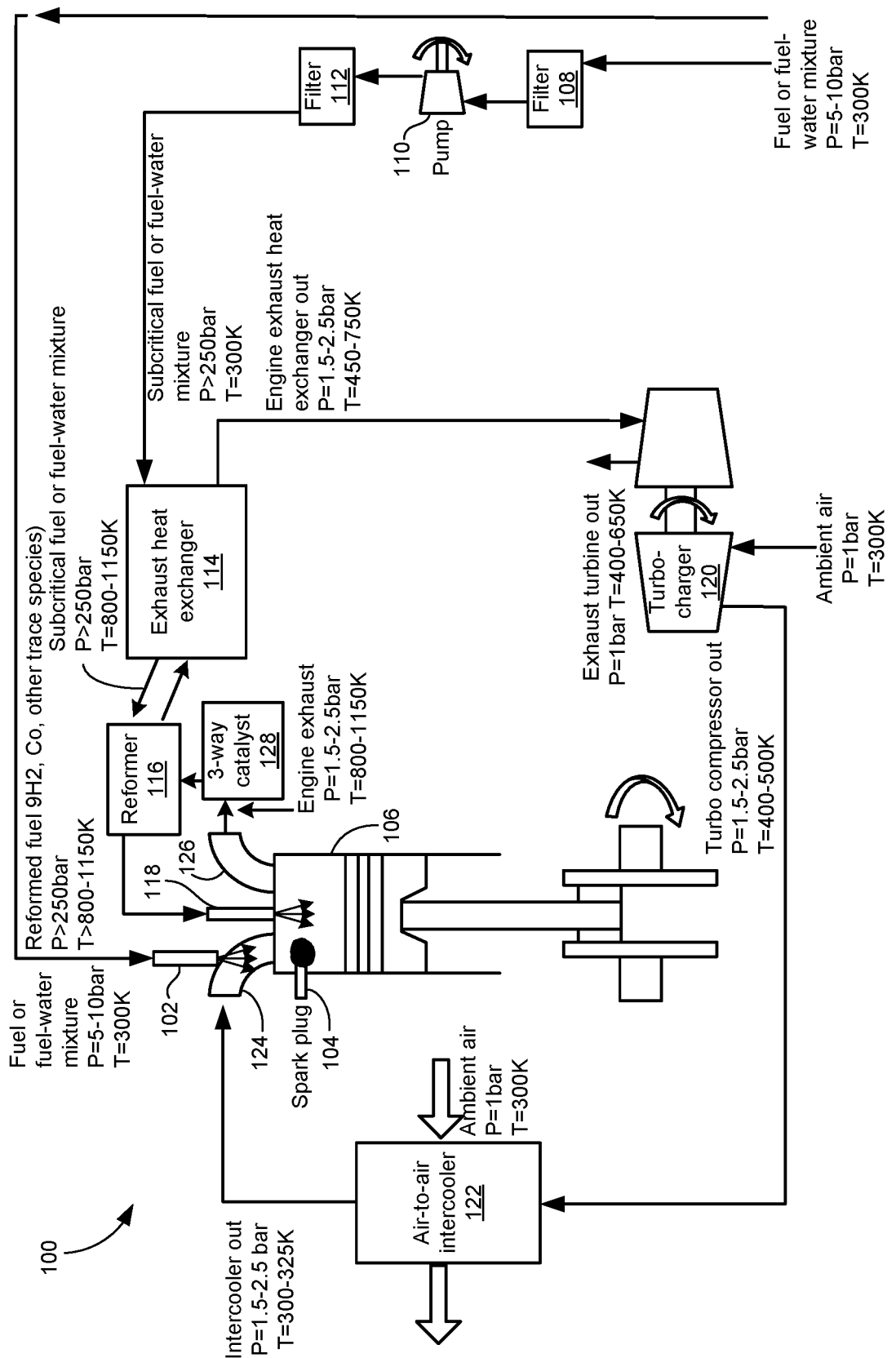

SUPERCRITICAL REFORMING OF FUELS, WITHOUT SEPARATE WATER SUPPLY, FOR INTERNAL COMBUSTION ENGINES

FIELD OF THE INVENTION

This document concerns an invention relating generally to reforming of material to generate fuel for internal combustion engines, and more specifically to supercritical reforming of fully-self-reforming materials into synthesis gas for use as an internal combustion engine fuel.

BACKGROUND OF THE INVENTION

Synthesis gas ("syngas"), a gas mixture which contains hydrogen (H2) and other gases such as carbon monoxide (CO), is useful in many applications, including use as a combustible fuel, and/or as raw material for production of plastics, other fuels, fertilizers, pesticides, and other materials. Syngas can be produced from hydrocarbons (including coal, natural gas, biomass, etc.) and other materials via a process known as "reforming." Many different reforming techniques are known, with perhaps the most common being steam reforming. In steam reforming, a materials are reacted with water in a "reformer," in the presence of a catalyst, to generate syngas.

As discussed in a prior patent application (U.S. application Ser. No. 15/960,735 filed Apr. 24, 2018, the contents of which are incorporated by reference herein), a reformer can be situated onboard a vehicle to reform a first liquid fuel into a second syngas fuel, with the second syngas fuel then being supplied to an internal combustion engine (possibly in conjunction with the first liquid fuel, e.g., in "dual-fuel" Reactivity Controlled Compression Ignition (RCCI) combustion). The second syngas fuel is provided to the engine in a supercritical fluid state, allowing its direct injection into the engine's cylinder(s) without premature ignition (autoignition), a problem which tends to arise when the syngas is provided in gaseous form. (A supercritical fluid results when a substance is at a pressure and temperature above its critical point, where distinct liquid and gas phases do not exist: it can effuse through solids like a gas, and dissolve materials like a liquid.) Moreover, by pressurizing and/or heating the first liquid fuel such that it approaches or reaches a supercritical fluid state prior to reforming, such that the resulting second syngas fuel is produced in the supercritical fluid state, the arrangement avoids the need for post-production pressurization of gaseous syngas into the supercritical fluid state (a step which would consume a significant amount of the engine's output power).

Typically, sufficient water can be captured from the engine's exhaust for supply to the reformer that no (or little) additional water need be supplied from an external source to the reformer/engine arrangement to support the reforming process. However, the added components needed to condense and store the exhaust water lead to additional complexity, bulk, and cost, and also lead to freezing issues in cooler climates.

SUMMARY OF THE INVENTION

The invention, which is defined by the claims set forth at the end of this document, relates to an engine/reformer system which reduces or eliminates the foregoing problems. A reformer is preferably provided as a unit with an internal combustion engine, such that the reformer and engine can be situated together on a vehicle powered by the engine. A first fuel is reformed in a pressurized and/or heated state, preferably in a state which is supercritical (or approximately so), such that a second syngas fuel is produced in a supercritical fluid state. The supercritical syngas (i.e., the supercritical mixture of H2 and other reformation products) can then be supplied to a combustion chamber of the internal combustion engine, preferably via direct injection, and can be ignited via spark ignition or compression ignition. By using supercritical syngas, which is injectable into the combustion chamber with no (or at least with controllable) autoignition problems, the system avoids the need to pressurize gaseous syngas prior to injection, and avoids the losses arising from such pressurization.

The first fuel is preferably fully self-reforming, that is, no separate water supply is needed to support conversion of all of the first fuel to syngas via steam reforming (that is, it can be fully reformed without the need for any water apart from any present in the first fuel). A particularly preferred first fuel is hydrous ethanol (ethanol from an ethanol production facility which has not yet been distilled or otherwise dewatered), with water being present (or added) such that the total water content is approximately 25% by volume or more (25% being approximately the amount needed for full reforming of anhydrous ethanol, also known as dehydrated or dry ethanol). This beneficially allows direct use of "unfinished" hydrous ethanol from an ethanol production facility, without the need for the energy-consuming final dehydration steps typically used to produce anhydrous fuel ethanol. However, other first fuels might be used instead, including hydrocarbons or other matter which are premixed with water in a subcritical state prior to pressurization and reforming, and which are fully self-reforming once mixed with an appropriate amount of water (e.g., ethers such as dimethyl ether). First fuels can also simply be matter which is fully reformable without the addition of water, e.g., methanol, ammonia.

The engine can be operated using the second syngas fuel alone, including operation at a stoichiometric air/fuel ratio. As is well known, diesel (compression ignition) engines run at a lean air-to-fuel ratio (with more air than necessary to fully react with the fuel), rather than at a stoichiometric air-to-fuel ratio (with just the right amount of air to fully react with the supplied fuel), because stoichiometric operation tends to result in high unburned hydrocarbon (soot) formation. Syngas beneficially does not form soot, thereby allowing stoichiometric combustion without the need for expensive exhaust after-treatment measures. Alternatively, the second syngas fuel and first fuel can both be used in the engine, either at different times (e.g., under different speed/load conditions) or simultaneously (e.g., in RCCI "dual-fuel" operation).

Further advantages, features, and objects of the invention will be apparent from the remainder of this document in conjunction with the associated drawings.

BRIEF DESCRIPTION OF THE DRAWINGS

FIG. 1 presents a schematic diagram of an exemplary internal combustion engine and reformer system useful for either spark ignition or compression ignition operation using supercritical syngas produced from a reformed hydrocarbon fuel.

DETAILED DESCRIPTION OF EXEMPLARY VERSIONS OF THE INVENTION

The exemplary engine/reformer system of the aforementioned drawing will now be reviewed. Throughout the following discussion, exemplary temperatures and pressures will be noted for the various fluids used in the system. It should be understood that these temperatures and pressures may vary depending on the choice of components used in the system, the fuel(s) used in the system, ambient conditions, and similar factors.

FIG. 1 illustrates an exemplary engine/reformer system 100 which can operate solely on syngas generated from a first fuel (which is preferably a fully self-reforming fuel, and which may be a "wet" fuel, i.e., it may contain water), and which can additionally or alternatively use the first fuel under at least some speed/load conditions (and which might use either compression ignition or spark ignition depending on conditions). The first fuel may be one or more alcohols; in the following discussion, ethanol will be considered as the first fuel, in particular "wet" ethanol containing approximately 25% water. This amount of water is needed because the reforming process requires approximately 24% water to 76% anhydrous (i.e., dehydrated) ethanol to fully reform the ethanol. Since hydrous ethanol that is, ethanol having some amount of water mixed therein as a byproduct of the ethanol production process, prior to dehydration typically contains at least 4% water, additional water may need to be added to the wet ethanol prior to use as a first fuel, if the first fuel is to be fully self-reforming. This is easily done, as water is readily miscible with ethanol. It should be understood that different material(s) chosen for use in the first fuel may require addition of different amounts of water for full fuel reforming. The amount of water required for complete self-reforming may be zero, as some materials (e.g., methanol, ammonia) do not require additional water for complete reforming.

Looking to the bottom right of FIG. 1, the wet ethanol (P=5-10 bar, T=300K) is provided from a pressurized reservoir (not shown) to port injector 102 when ethanol-only operation is desired, e.g., at start-up and low load operation, and possibly during transient periods when the engine is changing between different speed/load states. A spark plug 104 is provided on the combustion chamber 106 to enable standard spark-ignited ethanol operation.

To produce syngas for use as an alternative or additional fuel, the ethanol is filtered at filter 108, and then further pressurized at pump 110 (P>250 bar, T=300K) and optionally filtered at a second filter 112. One or both of the filters 108 and 112 might be omitted, but are useful where the ethanol and/or added water may contain particles or other unwanted contaminants, as where the ethanol is "raw" (i.e., not fully processed) hydrous ethanol from a distillation facility, and/or where any added water is provided from an untreated/unprocessed source (e.g., from "stillage" wastewater from ethanol production, which tends to contain suspended solids). The ethanol is heated in heat exchanger 114 to reach a supercritical fluid state (P>250 bar, T=800-1150 K), and is then provided to a reformer 116 to generate supercritical syngas (P>250 bar, T>800-1150K) consisting of H2, CO, and other trace species. The supercritical syngas may then be provided to a syngas injector 118 for injection into the combustion chamber 106, where it might be ignited via compression ignition or spark ignition, and with or without ethanol in the chamber 106, with the ignition mode and fuel(s) being chosen in accordance with speed/load conditions. It is notable that the power required to place the (liquid) ethanol into a supercritical fluid state—which readily enables production of syngas in the supercritical fluid state (with supercritical syngas in turn enabling high-pressure direct injection into the combustion chamber, which greatly eases control of ignition timing) —is far lower than the power needed to place gaseous syngas in the supercritical fluid state, allowing the engine's power output to be directed to other purposes.

Now considering the system's air intake, looking near the bottom middle of FIG. 1, ambient air (P=1 bar, T=300K) is preferably pressurized by a turbocharger 120 (P=1.5-2.5 bar, T=400-500K). The air is then preferably cooled in an air-to-air intercooler/heat exchanger 122 so that its temperature is closer to ambient (P=1.5-2.5 bar, T=300-325K) prior to supply to the engine's air intake manifold 124. The turbocharger 120 may be omitted and the engine may simply be naturally aspirated, but turbocharging can usefully increase power output and efficiency.

Now considering the system's exhaust, exhaust gas (P=1.5-2.5 bar, T=800-1150K) from the exhaust manifold 126 is first preferably provided to a catalytic converter 128, where an oxidation catalyst further converts any unburned CO and hydrocarbons (if present) to carbon dioxide and water vapor. The hot exhaust is then supplied to the reformer 116 so that its heat supports the reforming process, after which the exhaust goes to an exhaust heat exchanger 114 to further capture "waste" heat to assist in converting the input ethanol into the supercritical fluid state. The exhaust (P=1.5-2.5 bar, T=450-750K) leaving the exhaust heat exchanger 114 drives the input turbine of the turbocharger 120 used to pressurize the engine's ambient air supply. The exhaust leaving the turbocharger 120 (P=1 bar, T=400-650K) is then released to the environment (P=1 bar, T=300K).

The depicted system may be adapted in numerous ways to allow different modes of operation with different first fuels. As examples, the syngas from the reforming process might also or alternatively be provided to a port injector, and the first fuel might also or alternatively be provided to the direct injector 118 (or to another direct injector). An exhaust gas recirculation (EGR) system and/or other emissions reduction components might be incorporated. Features can be combined or removed, rather than added; for example, the heat exchanger 114 and reformer 116 might be provided as a single component. As another example, the low-pressure port injector 102 might be omitted (and spark plug 104 as well), leaving only direct injection of syngas via injector 118. In this case, the engine would operate solely on syngas using compression ignition either at lean or stoichiometric conditions. Under lean conditions, where nitrous oxide emissions are of concern, it is expected that exhaust gas recirculation (EGR) and/or Selective Catalytic Reduction (SCR) might be used for emissions control. Since syngas beneficially creates no soot under stoichiometric conditions, a three-way catalyst (TWC) might be suitable for emissions control under stoichiometric operation.

Throughout this document, where the terms "primarily," "substantially," and the like are used, these should be regarded as meaning "in major part." For example, a fuel formed primarily or substantially of ethanol has over half of its volume formed of ethanol.

Also throughout this document, where a measurement or other value is qualified by the term "approximately," "about," "nearly," "roughly," or the like—for example, "approximately 25% water"—this can be regarded as referring to a variation of 15% from the noted value. Thus, as an example, "approximately 25% water" can be understood to mean within 3.75% (i.e., 15% of 25%) of 25% water.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A method of operating an internal combustion engine, the method including the steps of:
   a. providing a first fuel to a reformer to produce syngas, wherein the first fuel is fully convertible to syngas:
      (1) when subjected to steam reforming, and
      (2) without addition of water apart from any water present in the first fuel; and
   b. supplying the syngas in a supercritical fluid state to a combustion chamber of the internal combustion engine.

2. The method of claim 1 wherein the first fuel has water mixed therein.

3. The method of claim 1 further including the step of adding water to the first fuel prior to providing the first fuel to the reformer.

4. The method of claim 1 wherein the first fuel primarily contains one or more alcohols.

5. The method of claim 4 wherein the first fuel primarily contains ethanol.

6. The method of claim 5 wherein the first fuel contains approximately 25% water.

7. The method of claim 1 wherein the first fuel is in a supercritical fluid state when provided to the reformer.

8. The method of claim 1 wherein the first fuel is also provided to the combustion chamber of the internal combustion engine.

9. The method of claim 8 wherein the first fuel and syngas are both present in the combustion chamber during a combustion cycle.

10. A method of operating an internal combustion engine, the method including the steps of:
    a. reforming a first fuel to produce syngas, wherein:
       (1) the first fuel primarily contains one or more alcohols, and
       (2) the syngas is a supercritical fluid; and
    b. supplying the supercritical syngas to a combustion chamber of the internal combustion engine.

11. The method of claim 10 wherein the first fuel is fully convertible to syngas:
    a. when subjected to steam reforming, and
    b. without addition of water, apart from any water present in the first fuel.

12. The method of claim 10 wherein the first fuel has water mixed therein prior to providing the first fuel to the reformer.

13. The method of claim 10 wherein the first fuel contains wet ethanol.

14. The method of claim 10 further including the step of adding water to the first fuel prior to producing syngas from the first fuel.

15. The method of claim 10 wherein the first fuel is in a supercritical fluid state prior to reforming.

16. The method of claim 10 wherein the first fuel is also supplied to the combustion chamber of the internal combustion engine, such that the first fuel and syngas are both present in the combustion chamber during a combustion cycle.

17. A method of operating an internal combustion engine, the method including the steps of:
    a. reforming a first fuel to produce syngas, wherein:
       (1) the first fuel has water mixed therein,
       (2) the first fuel is in a supercritical fluid state prior to reforming, and
       (3) the syngas is a supercritical fluid; and
    b. supplying the supercritical syngas to a combustion chamber of the internal combustion engine.

18. The method of claim 17 wherein the first fuel is fully convertible to syngas:
    a. when subjected to steam reforming, and
    b. without addition of water, apart from any water present in the first fuel.

19. The method of claim 17 wherein the first fuel primarily contains one or more alcohols.

20. The method of claim 17 wherein the first fuel contains wet ethanol.

21. The method of claim 17 further including the steps of:
    a. mixing water into the first fuel, and
    b. thereafter providing the first fuel to a reformer, wherein the reformer provides the reforming of the first fuel to produce the syngas.

* * * * *